(12) United States Patent
Rahman et al.

(10) Patent No.: US 11,139,043 B2
(45) Date of Patent: Oct. 5, 2021

(54) SYSTEMS AND METHODS FOR IDENTIFYING COUNTERFEIT MEMORY

(71) Applicants: M. Tauhidur Rahman, Huntsville, AL (US); Bashir Mohammad Sabquat Bahar Talukder, Huntsville, AL (US)

(72) Inventors: M. Tauhidur Rahman, Huntsville, AL (US); Bashir Mohammad Sabquat Bahar Talukder, Huntsville, AL (US)

(73) Assignee: Board of Trustees of the University of Alabama, for and on behalf of the University of Alabama in Huntsville, Huntsville, AL (US)

( * ) Notice: Subject to any disclaimer, the term of this patent is extended or adjusted under 35 U.S.C. 154(b) by 0 days.

(21) Appl. No.: 16/879,599

(22) Filed: May 20, 2020

(65) Prior Publication Data
US 2020/0372967 A1    Nov. 26, 2020

Related U.S. Application Data

(60) Provisional application No. 62/850,271, filed on May 20, 2019.

(51) Int. Cl.
*G11C 29/44* (2006.01)
*G11C 29/38* (2006.01)
(Continued)

(52) U.S. Cl.
CPC .............. *G11C 29/38* (2013.01); *G06F 21/44* (2013.01); *G06F 21/79* (2013.01); *G06K 9/6256* (2013.01);
(Continued)

(58) Field of Classification Search
CPC ......... G11C 29/38; G11C 29/44; G11C 29/02; G11C 7/20; G11C 16/20; G11C 8/12;
(Continued)

(56) References Cited

U.S. PATENT DOCUMENTS 5,089,951 A * 2/1992 Iijima ................... G06F 11/076
                                                     710/36
5,321,241 A   6/1994 Craine
(Continued)

OTHER PUBLICATIONS

Wang, et al., "Flash Memory for Ubiquitous Hardware Security Functions: True Random Number Generation and Device Fingerprints," 2012 IEEE Symposium on Security and Privacy, San Francisco, CA, 2012, pp. 33-47.
(Continued)

*Primary Examiner* — Michael T Tran
(74) *Attorney, Agent, or Firm* — Maynard Cooper & Gale, P. C.; Jon E. Holland

(57) ABSTRACT

Due to design variations, process variations, manufacturing variations, and other factors, memory of a certain type manufactured by one manufacturer often exhibits a unique pattern of performance characteristics relative to the patterns of the same type of performance characteristics exhibited by memory from other manufacturers. A system for identifying counterfeit memory is trained to learn the different patterns of performance characteristics for different manufacturers of memory. Thereafter, the system may analyze the performance of a given memory device to determine whether the memory device has been manufactured by a particular manufacturer. Thus, the system is capable of determining whether the memory device is counterfeit (e.g., has been manufactured by an unexpected manufacturer).

12 Claims, 2 Drawing Sheets

(51) Int. Cl.
    *G11C 29/02* (2006.01)
    *G06K 9/62* (2006.01)
    *G06F 21/44* (2013.01)
    *G06F 21/79* (2013.01)
    *G11C 7/20* (2006.01)

(52) U.S. Cl.
    CPC ............... *G11C 7/20* (2013.01); *G11C 29/02* (2013.01); *G11C 29/44* (2013.01)

(58) Field of Classification Search
    CPC ........... G11C 2029/0407; G11C 29/50; G11C 2029/5002; G11C 2029/4402; G06K 9/6256; G06F 21/44; G06F 21/79; G06F 21/78
    USPC .................................................. 365/156, 201
    See application file for complete search history.

(56) References Cited

U.S. PATENT DOCUMENTS

| | | | |
|---|---|---|---|
| 5,652,803 A | 7/1997 | Tachikawa | |
| 6,360,208 B1* | 3/2002 | Ohanian | G06Q 10/087 705/31 |
| 6,442,644 B1 | 8/2002 | Gustavson | |
| 6,659,353 B1 | 12/2003 | Okamoto | |
| 7,082,598 B1* | 7/2006 | Le | G06F 9/4411 703/21 |
| 7,415,732 B2 | 8/2008 | Montecalvo | |
| 7,491,948 B2 | 2/2009 | Gordon et al. | |
| 8,489,901 B2* | 7/2013 | Boudreaux | H04L 9/0841 713/194 |
| 8,572,440 B1 | 10/2013 | Nunally | |
| 9,530,512 B2 | 12/2016 | Ray et al. | |
| 9,543,028 B2 | 1/2017 | Ray et al. | |
| 9,575,125 B1 | 2/2017 | Andre | |
| 9,727,899 B2* | 8/2017 | Kesavan | G06Q 30/06 |
| 10,204,008 B2 | 2/2019 | Trezise | |
| 10,223,199 B2 | 3/2019 | Hahn | |
| 10,509,132 B1 | 12/2019 | Ray et al. | |
| 10,878,922 B1 | 12/2020 | Ray et al. | |
| 2004/0041197 A1 | 3/2004 | Jong et al. | |
| 2004/0191989 A1 | 9/2004 | Ngo | |
| 2007/0043667 A1 | 2/2007 | Qawami | |
| 2007/0079387 A1 | 4/2007 | Montecalvo | |
| 2008/0082872 A1 | 4/2008 | Nagasaka | |
| 2009/0165086 A1 | 6/2009 | Trichina | |
| 2010/0125765 A1 | 5/2010 | Orbach | |
| 2010/0140488 A1 | 6/2010 | Visconti | |
| 2011/0055917 A1* | 3/2011 | Wickstrom | G06F 21/10 726/17 |
| 2011/0117881 A1* | 5/2011 | Luoma | H04W 8/18 455/410 |
| 2011/0234241 A1 | 9/2011 | Lewis et al. | |
| 2012/0166814 A1 | 6/2012 | Hayashi | |
| 2013/0127442 A1 | 5/2013 | Satoh | |
| 2014/0006738 A1* | 1/2014 | Nagai | G06F 21/78 711/163 |
| 2014/0016776 A1* | 1/2014 | Van Foreest | H04L 9/0869 380/46 |
| 2014/0037086 A1 | 2/2014 | Seol | |
| 2014/0075051 A1 | 3/2014 | Zadesky | |
| 2014/0101063 A1 | 4/2014 | Paul et al. | |
| 2014/0143619 A1 | 5/2014 | Gorman | |
| 2014/0146607 A1 | 5/2014 | Nagai | |
| 2015/0026330 A1* | 1/2015 | Ahmed | H04W 4/10 709/224 |
| 2015/0067872 A1* | 3/2015 | Balabine | H04L 63/0492 726/26 |
| 2015/0089630 A1* | 3/2015 | Lee | G06F 21/44 726/16 |
| 2015/0095550 A1 | 4/2015 | Khan | |
| 2015/0096058 A1* | 4/2015 | Matsukawa | G06F 12/1408 726/29 |
| 2015/0169247 A1 | 6/2015 | Wang | |
| 2015/0193204 A1 | 7/2015 | Lin | |
| 2015/0268934 A1 | 9/2015 | Anderson | |
| 2016/0034217 A1 | 2/2016 | Kim | |
| 2016/0255056 A1* | 9/2016 | Shalunov | H04L 51/12 713/168 |
| 2017/0032843 A1 | 2/2017 | Ilani | |
| 2017/0046129 A1 | 2/2017 | Cambou | |
| 2017/0090873 A1 | 3/2017 | Clark | |
| 2017/0126229 A1 | 5/2017 | Tan et al. | |
| 2017/0269992 A1 | 9/2017 | Bandic | |
| 2017/0323279 A1* | 11/2017 | Dion | G06K 9/78 |
| 2018/0060563 A1* | 3/2018 | Tashiro | H04L 9/0643 |
| 2018/0158493 A1 | 6/2018 | Ryu | |
| 2018/0287793 A1 | 10/2018 | Khativ Zadeh | |
| 2019/0147202 A1* | 5/2019 | Harney | H04W 4/80 235/375 |
| 2019/0294500 A1 | 9/2019 | Hara | |
| 2019/0319790 A1* | 10/2019 | Fenner | G06F 21/57 |
| 2019/0349204 A1* | 11/2019 | Enke | H04L 9/0861 |
| 2020/0034583 A1* | 1/2020 | Nikitin | G06K 7/10475 |
| 2020/0044871 A1* | 2/2020 | Lu | G11C 11/4076 |
| 2020/0051349 A1* | 2/2020 | Campbell | G07C 9/22 |
| 2020/0059780 A1* | 2/2020 | Hess | H04L 9/3247 |
| 2020/0081689 A1 | 3/2020 | Huang | |
| 2020/0099540 A1* | 3/2020 | Lu | H04L 9/3278 |
| 2020/0204367 A1 | 6/2020 | Miller | |
| 2020/0279043 A1* | 9/2020 | Thornton | G06N 5/022 |
| 2020/0357742 A1* | 11/2020 | Then | H01L 29/78 |
| 2020/0367471 A1* | 11/2020 | Deliou | A01K 11/008 |
| 2020/0372967 A1 | 11/2020 | Rahman | |

OTHER PUBLICATIONS

Poudel, et al., "Microcontroller TRNGs Using Perturbed States of NOR Flash Memory Cells," in IEEE Transactions on Computers, vol. 68, No. 2, pp. 307-313, Feb. 2019.

Ray, et al., "True Random Number Generation Using Read Noise of Flash Memory Cells," in IEEE Transactions on Electron Devices, vol. 65, No. 3, pp. 963-969, Mar. 2018.

Guin, et al., "Counterfeit Integrated Circuits: A Rising Threat in the Global Semiconductor Supply Chain," Proceedings of the IEEE, Aug. 2014, pp. 1207-1228, vol. 102, No. 8.

Guin, et al., "Counterfeit ID Detection and Challenges Ahead," ACM SIGDA Newsletter, Jan. 2013, pp. 1-6.

Guo, et al., "FFD:A Framework for Fake Flash Detection," ACM, Jun. 2017, pp. 1-6.

Kumari, et al., Independent Detection of Recycled Flash Memory: Challenges and Solutions, IEEE, 2018, pp. 89-95.

Irom, et al., "Single Event Effect and Total Ionizeing Dose Results of HIghly Scaled Flash Memories," Radiation Effects Data Workshop (REDW), 2013 IEEE, pp. 1-4.

Wikipedia, "Flash Memory," http://en.wikipedia.org/wiki/Flash_memory, Dec. 13, 2017.

Ray, et al., U.S. Appl. No. 16/415,774 entitled, "Random Number Generation Systems and Methods," filed May 17, 2019.

Ray, et al., U.S. Appl. No. 16/219,586 entitled, "Systems and Methods for Detecting Counterfeit Memory," filed Dec. 13, 2018.

Ray, et al., U.S. Appl. No. 16/809,191 entitled, "Systems and Methods for Runtime Analog Sanitation of Memory," filed Mar. 4, 2020.

Ray, et al., U.S. Appl. No. 17/319,611 entitled, "Systems and Methods for Detecting Counterfeit Memory," filed May 13, 2021.

\* cited by examiner

SYSTEMS AND METHODS FOR IDENTIFYING COUNTERFEIT MEMORY

CROSS REFERENCE TO RELATED APPLICATION

This application claims priority to U.S. Provisional Patent Application No. 62/850,271, entitled "Exploiting Latency Variations to Identify the Origin of DRAM Manufacturer" and filed on May 20, 2019, which is incorporated herein by reference.

RELATED ART

With the globalization of the semiconductor supply chain, counterfeit memory chips and modules have been spreading worldwide at an alarming rate. Deploying counterfeit memory into an electronic system can have severe consequences on security and reliability domains because of their sub-standard quality, poor performance, and shorter life span. Counterfeit memory can also be more vulnerable to security attacks. However, detecting counterfeit memory is challenging because of their ability to pass initial testing. Improved techniques for detecting counterfeit memory rapidly, accurately, and inexpensively are generally desired.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods for identifying counterfeit memory. Due to design variations, process variations, manufacturing variations, and other factors, memory of a certain type manufactured by one manufacturer often exhibits a unique pattern of performance characteristics relative to the patterns of the same type of performance characteristics exhibited by memory from other manufacturers. In accordance with some embodiments of the present disclosure, a system for identifying counterfeit memory is trained to learn the different patterns of performance characteristics for different manufacturers of memory. Thereafter, the system may analyze the performance of a given memory device, such as a memory chip or memory module, to determine whether the memory device has been manufactured by a particular manufacturer. Thus, the system is capable of determining whether the memory device is counterfeit (e.g., has been manufactured by an unexpected manufacturer).

Figure 1:
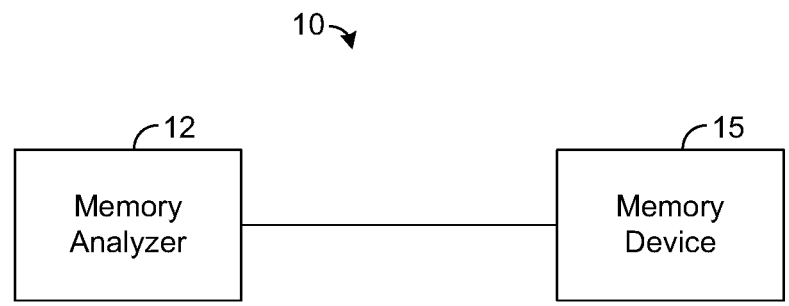
FIG. 1 is a block diagram illustrating an exemplary embodiment of a system for identifying counterfeit memory.

FIG. 1 depicts an exemplary embodiment of a system 10 for identifying counterfeit memory. As shown by FIG. 1, the system 10 comprises a memory analyzer 12 that is coupled to a memory device 15 to be tested. In this regard, the memory device 15 includes memory (not specifically shown in FIG. 1) for which it is desirable to determine the origin (e.g., whether it has been manufactured by a particular manufacturer). As an example, the memory device 15 may be a memory chip, a memory module (e.g., a memory card), or any other device having memory. The memory analyzer 12 is configured to receive results of a memory test performed on the device 15 where such results are indicative of performance characteristics of the device 15 during the test. The memory analyzer 12 is further configured to analyze such results to identify an origin of the device 15, as will be described in more detail below.

Figure 2:
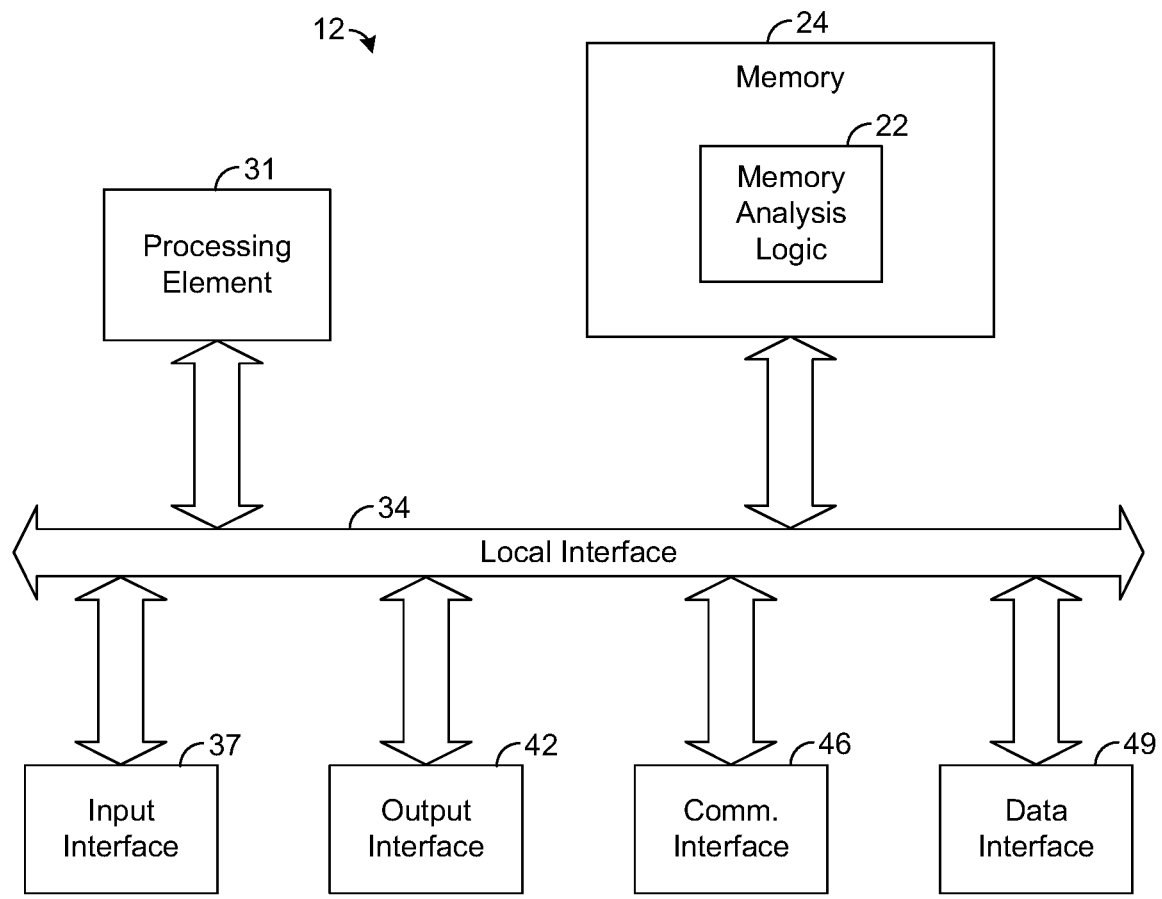
FIG. 2 is a block diagram illustrating an exemplary embodiment of a memory analyzer, such as is depicted by FIG. 1.

FIG. 2 depicts an exemplary embodiment of the memory analyzer 12. As shown by FIG. 2, the memory analyzer 12 comprises memory analysis logic 22 for generally controlling the operation of the memory analyzer 12, as will be described in more detail hereafter. The memory analysis logic 22 can be implemented in software, hardware, firmware or any combination thereof. In the exemplary embodiment illustrated by FIG. 2, the memory analysis logic 22 is implemented in software and stored in memory 24 of the analyzer 12.

Note that the memory analysis logic 22, when implemented in software, can be stored and transported on any computer-readable medium for use by or in connection with one or more processors that can fetch and execute instructions. In the context of this document, a "computer-readable medium" can be any means that can contain or store a computer program for use by or in connection with at least one processor.

The exemplary memory analyzer 12 depicted by FIG. 2 comprises at least one conventional processor 31, such as a digital signal processor (DSP) or a central processing unit (CPU), that communicates to and drives the other elements within the analyzer 12 via a local interface 34, which can include at least one bus. Furthermore, an input interface 37, for example, a keyboard or a mouse, can be used to input data from a user of the analyzer 12, and an output interface 42, for example, a printer, monitor, liquid crystal display (LCD), or other display apparatus, can be used to output data to the user. In some embodiments, the input interface 37 and the output interface 42 may share hardware components. As an example, the input interface 37 and output interface 42 may be implemented by a touchscreen that displays information to a user and receives inputs via capacitive sensing of contact with the touchscreen. Other types of devices for the input interface 37 and/or output interface 42 are possible in other embodiments.

Further, a communication interface 46, such as at least one modem or wireless transceiver (e.g., a radio frequency (RF) or cellular radio), may be used to communicate with external devices or systems, such as a communication network (not shown). The analyzer 12 of FIG. 2 also has a data interface 49 for communicatively (e.g., electrically, wirelessly, or optically) interfacing with other devices, such as the memory device 15 of FIG. 1.

Figure 3:
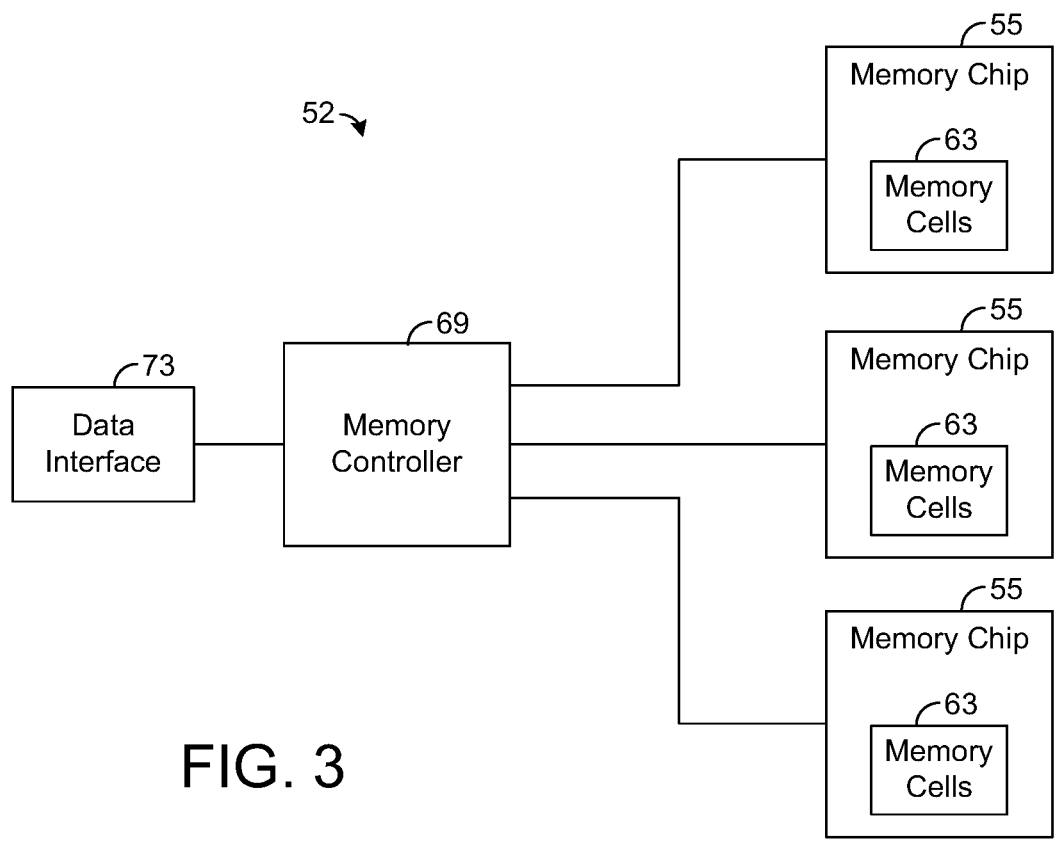
FIG. 3 is a block diagram illustrating an exemplary embodiment of a memory module.

As noted above, the memory device 15 may be any device having memory, such as a memory chip or a memory module. FIG. 3 shows an exemplary embodiment of the memory device 15 when it is implemented as a memory module 52 for storing data in a plurality of memory chips 55. The memory chips 55 may be of various types, such as dynamic random-access memory (DRAM), static random-access memory (SRAM), flash memory, or other types of known memory. As shown by FIG. 3, each memory chip 55 may have a plurality of memory cells 63 in which data may be stored. As an example, each cell 63 may store charge representing a one-bit value, though each cell 63 may represent any number of bits in other embodiments. As known in the art, the cells 63 may be arranged in rows, known as "wordlines" or "pages", and columns, known as "bitlines."

As shown by FIG. 3, the module 52 has a memory controller 69 that is configured to access the memory chips 55 for storing to or reading from the memory chips 55. As an example, the memory controller 69 may receive a write command for writing a data value to a virtual memory address and translate the virtual memory address to a physical memory address. The memory controller 69 may then write data from the write command to memory cells 63 of one or more of the memory chips 55 at the physical address. The memory controller 69 may also receive a read command for reading a data value from a virtual memory address and translate the virtual memory address to a physical memory address. The controller 69 may then access memory cells 63 of one or more of the memory chips 55 to read data from the physical memory address and return the read data in response to the read command. As known in the art, the memory controller 69 may perform other types of operations for controlling the memory chips 55, as may be desired.

In some embodiments, the memory controller 69 is implemented in hardware, such as field programmable gate array (FPGA), but the memory controller 69 may be implemented in any combination of hardware, software, or firmware in other embodiments. As an example, the memory controller 69 may have one or more processors (not shown) executing software instructions for performing one or more functions, as described herein.

As shown by FIG. 3, the analyzer 12 of FIG. 2 may have a data interface 73 for communicatively (e.g., electrically, wirelessly, or optically) interfacing with other devices, such as the memory analyzer 12 of FIG. 1.

Memory devices 15 generally have performance characteristics that vary randomly or pseudo-randomly based on various factors, such as processing variations, design variations, and manufacturing variations. From device-to-device for memory devices 15 from same origin (e.g., manufactured by the same manufacturer), there may be correlations in variations of these performance characteristics that can be learned and used to identify devices from such origin. As an example, since devices 15 from the same manufacturer often have similar design, process, and manufacturing variations, the performance characteristics of devices from a particular manufacturer may vary device-to-device in some similar way to define patterns or correlations that can be learned. Later, if a device has performance characteristics that correspond to (e.g., are consistent with or match) the learned pattern, then a determination may be made that the device has been manufactured by the particular manufacturer. This information may then be used to determine whether the memory device is counterfeit.

To better illustrate the foregoing, consider an SRAM memory chip that has a plurality of memory cells, and each memory cell has transistors that form a pair of cross-coupled invertors, as known in the art. At power up, these invertors race each other to set the value in the memory cell to a logical low (e.g., 0) or logical high (e.g., 1). This initial value that is initialized on power up, referred to herein as a "power-up default value," is essentially random depending on manufacturing variations and other factors. Each time the chip is powered on, the same memory cell should be set to the same power-up default value, though these power-up default values randomly vary from cell-to-cell based on manufacturing, process, and design variations. Thus, the power-up default values stored in the memory cells after power up define a set of performance characteristics or a performance signature that is unique to that particular memory chip. As used herein, the term "performance signature" generally refers to a set of performance characteristics of a memory device 15 that is unique to the memory device. As will be described in more detail below, one or more performance signatures may be used to identify an origin of the memory device 15.

In this regard, there may be correlations in variations of the power-up default values of SRAM chips from the same manufacturer. As an example, a given manufacturer typically utilizes the same techniques and tolerances when manufacturing memory chips. Thus, even though there may be uncontrollable manufacturing variations that result in differences between chips manufactured by the same manufacturer, these differences typically vary in a somewhat similar way from chip-to-chip of the same manufacturer relative to chips from other manufacturers so that patterns or correlations in the variations may exist and can be learned. Thus, if a given chip has a performance signature corresponding to (e.g., consistent with or matching) the learned patterns or correlations of a manufacturer for that type of signature, then the chip may be identified as having been manufactured by that manufacturer.

Thus, in some embodiments, the memory analysis logic 22 may analyze the performance signatures of many devices from a particular manufacturer to learn correlations or patterns in variations of such signatures. Thereafter, the memory analysis logic 22 may analyze the performance signature of a given memory device 15 to determine whether it corresponds to the learned correlations or patterns and then, based on this determination, determine whether the memory device 15 has been manufactured by such manufacturer.

Note that there are various techniques than can be used to learn correlations or patterns in the signatures of devices 15 manufactured by the same manufacturer. In some embodiments, the memory analysis logic 22 implements a machine learning algorithm that is trained to learn correlations or patterns in variations of performance signatures. As known in the art, "machine learning" generally refers to neural computing techniques or artificial intelligence whereby a computer effectively "learns" relationships between inputs and outputs.

As an example, as indicated above, the power-up default values of a memory device 15 may be used as a performance signature. In such example, the performance signature may be a bit vector where each bit of the bit vector corresponds to a particular memory cell 63 and indicates the power-up default value read from such cell 63. When performance signatures of this type, referred to hereafter as "power-up default signatures," are to be used, the memory analysis logic 22 may be trained to learn correlations or patterns of signatures for different manufacturers. In this regard, the logic 22 may be provided with training data having a plurality of entries where each entry indicates (1) a power-up default signature (i.e., a set of power-up default values read from or otherwise determined for a respective memory device 15) and (2) an identifier of the device's manufacturer. The set of power-up default values for the memory device 15 may be obtained by powering up the memory device 15 and then simply reading the power-up default values from the cells 63 of the memory device 15 before these power-up default values are overwritten by other memory operations.

Based on the training data, the logic 22 learns correlations or patterns in the power-up default signatures among devices of the same manufacturer so that the logic 22 can analyze a power-up default signature from a memory device 15 and determine whether the device 15 has been manufactured by that manufacturer based on the similarity between the power-up default signature and the learned correlations or patterns for that manufacturer. That is, the device 15 is determined to be manufactured by such manufacturer if its power-up default signature corresponds to (e.g., is consistent with or matches) the learned correlations or patterns in power-up default signatures for devices 15 from that manufacturer.

Note that the learned correlations or patterns may be based on many factors. As an example, the logic 22 may learn that the power-up default values of devices 15 from a particular manufacturer often have a total number of logical high values (e.g., 1's) within a particular range and that the power-up default values at certain memory cells 63 and, thus, the bit positions of the power-up default signature tend to have a particular values (e.g., either a logical high value or a logical low value). Many other types of factors may be used in other embodiments. In effect, using the training data, the memory analysis logic 22 learns how to map inputs (power-up default signatures in this example) to a desired output (such as an identity of the manufacturer that manufactured the memory device 15 from which a respective power-up default signature was obtained).

Once the memory analysis logic 22 has been trained, it may be used to determine whether a given memory device 15 is counterfeit. As an example, the memory analysis logic 22 may be configured to receive a power-up default signature from a memory device 15 under test. In this regard, to generate the power-up default signature, the memory analysis logic 22 may transmit a read command to the memory controller 69 requesting the power-up default values in the cells 63 of the device 15 under test to be read after power up. In response, the memory controller 69 reads the power-up default values from the memory cells 63 and returns these power-up default values, which define the power-up default signature in this example. The memory analysis logic 22 then analyzes the power-up default signature to determine whether it corresponds to the learned correlations or patterns in power-up default signatures for at least one manufacturer. If so, the memory analysis logic 22 determines that the device 15 under test has been manufactured by such manufacturer and provides an output indicative of the manufacturer (e.g., displays an identifier, such as a name, of the manufacturer). Based on such output, a determination as to whether the device 15 under test is counterfeit may be made.

Alternatively, the memory analysis logic 22 may be configured to make a determination as to whether the device 15 under test is counterfeit and to then provide an output indicative of such determination without necessarily outputting an identifier of the manufacturer. As an example, the memory analysis logic 22 may be aware of (e.g., receive an input indicative of) which manufacturer is expected to have manufactured the device 15 under test and simply provide an output confirming whether the logic 22 has determined that such manufacturer indeed manufactured the device 15. In other embodiments, the memory analysis logit 22 may be trained to determine whether a device 15 under test has been manufactured by a particular manufacturer and provide an output simply confirming whether the device 15 is determined to have been manufactured by that particular manufacturer. As an example, a user may be only interested in knowing whether a memory device 15 has been manufactured by a particular manufacturer and, if the device 15 is manufactured by another manufacturer, the user may be uninterested in known the identity of the other manufacturer. Yet other techniques for indicating the origin of the device 15 under test are possible in other embodiments.

Note that, in other embodiments, other types of performance signatures may be used to identify an origin of a device 15 under test. As an example, variations in memory latency may be used to define a performance signature. In this regard, each memory device 15, based on its design, typically requires a certain minimum time to perform read and write operations successfully. Thus, after performing a write operation to a plurality of memory cells 63, a memory controller 69 is often configured to wait at least a certain minimum amount of time, referred to hereafter as the "minimum latency," before attempting a read operation of those memory cells 63 to allow full completion of the write operation. Attempting to read from the memory cells 63 less than the latency time from the write operation may result in errors in the read data. These error that result from reading a data value too soon after its write operation are referred to herein as "latency errors."

In some embodiments, the memory controller 69 is configured to define a performance signature, referred to hereafter as "latency signature," by writing a certain value to a plurality of cells 63 and then reading from those same cells 63 at a time less than the minimum latency from the write operation so that latency errors in the read data will be induced. From device-to-device, these latency errors will be random depending on the latency variations, which are based on manufacturing, process, and design variations. Thus, these types of data errors from memory devices 15 of the same type by the same manufacturer are likely to have correlations or patterns that can be learned and used to identify a device's origin, as described above for power-up default signatures. As an example, for devices 15 of the same type from the same manufacturer, there may be similarities in the total number of latency errors in each respective latency signature and in the bit positions of the latency signature. In this regard, as will be described in more detail below, the latency signature may be a bit vector where each bit corresponds to a respective memory cell 63 and indicates whether the value (e.g., bit value) read from such cell 63 is erroneous.

Thus, as described above for power-up default signatures, the memory analysis logic 22 may be trained using training data comprising latency signatures, where each latency signature is associated with an identifier of the manufacturer that manufactured the device 15 from which the latency signature was obtained. In effect, using the training data, the memory analysis logic 22 learns how to map inputs (latency signatures in this example) to a desired output (such as an identity of the manufacturer that manufactured the memory device 15 from which a respective latency signature was obtained). After training, the logic 22 can analyze the latency signature from a given memory device 15 and determine which manufacturer likely manufactured the device 15 based on the similarity of the latency signature to the correlations or patterns in latency signatures for that manufacturer learned from the training data.

To define a latency signature from a particular memory device 15, the memory controller 69 may be configured to initiate a write operation for writing a predefined data value (e.g., a multi-bit value) to a plurality of cells 63 and to then initiate a read operation for reading those same cells 63 at a predefined time after initiating the write operation. Such time is less than the minimum latency after initiating the write operation so that there will be latency errors in the read data depending on latency variations. The set of bit values returned for the read operation (which contains latency errors) may be used to define a latency signature. As an example, the data value read from the memory cells 63 may be compared to the predefined data value that was written to the same memory cells 63 by the previous write operation to determine which of the read values are erroneous. In such an embodiment, the latency signature may be a bit vector where each bit of the bit vector corresponds to a respective memory cell 63 and indicates whether an erroneous value was read from that cell 63. Such a refresh signature may be used, according to the techniques described above.

In other embodiments, yet other types of performance signatures may be used to identify an origin of a device 15 under test. As an example, in DRAM memory, it is well-known that the memory cells 63 should be periodically refreshed (i.e., recharged) at a certain rate in order for the cells 63 to retain the data values stored therein. If a memory cell 63 is not refreshed at a sufficiently high rate, referred to hereafter as the "minimum recharge rate," then it is possible that the cell 63 may lose a sufficient amount of charge such that the data bit stored in the memory cell 63 may erroneously flip to a new value.

In some embodiments, the memory controller 69 is configured to define a performance signature, referred to hereafter as "refresh signature," by changing the rate that it refreshes a plurality of cells 63 to a rate lower than the refresh rate so that at least some of the cells 63 will erroneously change values. These errors that result from refreshing the memory cells 63 too slowly are referred to herein as "refresh errors." From device-to-device, these refresh errors will be random depending on manufacturing, process, and design variations. Thus, these types of data errors from memory devices 15 of the same type by the same manufacturer are likely to have correlations or patterns that can be learned and used to identify a device's origin, as described above for power-up default signatures. As an example, for devices 15 of the same type from the same manufacturer, there may be similarities in the total number of refresh errors in each respective refresh signature and in the bit positions of the refresh signature. In this regard, as will be described in more detail below, the refresh signature may be a bit vector where each bit corresponds to a respective memory cell 63 and indicates whether the value (e.g., bit value) stored in such cell 63 is erroneous.

Thus, as described above for power-up default signatures, the memory analysis logic 22 may be trained using training data comprising refresh signatures, where each refresh signature is associated with an identifier of the manufacturer that manufactured the device 15 from which the refresh signature was obtained. In effect, using the training data, the memory analysis logic 22 learns how to map inputs (refresh signatures in this example) to a desired output (such as an identity of the manufacturer that manufactured the memory device 15 from which a respective refresh signature was obtained). After training, the logic 22 can analyze the refresh signature from a given memory device 15 and determine which manufacturer likely manufactured the device 15 based on the similarity of the refresh signature to the correlations or patterns in refresh signatures learned for that manufacturer from the training data.

To define a refresh signature from a particular memory device 15, the memory controller 69 may be configured to initiate a write operation for writing a predefined data value (e.g., a multi-bit value) to a plurality of cells 63 and to then control the refresh rate for the same memory cells 63 such that the refresh rate is less than the minimum refresh rate, thereby causing at least some of the bit values in the memory cells 63 to erroneously flip. The memory controller 69 then reads the bit values stored in the memory cells 63, noting that such read data includes refresh errors resulting from the low refresh rate. The set of data values returned for the read operation (which contains refresh errors) may be used to define a refresh signature. As an example, the data value read from the memory cells 63 may be compared to the predefined data value that was written to the same memory cells 63 by the previous write operation to determine which of the read values are erroneous. In such an embodiment, the refresh signature may be a bit vector where each bit of the bit vector corresponds to a respective memory cell 63 and indicates whether an erroneous value is stored in that cell 63. Such a refresh signature may be used, according to the techniques described above. In other embodiments, yet other types of performance signatures may be used identify the origin of a memory device 15.

Note that the determination of the origin of a particular memory device 15 may be based on many different types of performance signatures. As an example, for a DRAM device 15, the memory analysis logic 22 may determine a latency signature and a refresh signature and identify the origin of the device 15 based on both signatures according to the techniques described above. Generally, the decision of a device's origin may be more accurate when more types of signatures are used for the decision.

Note that there are various techniques and times that may be used for testing memory devices 15. As an example, in some embodiments, the memory analyzer 12 may be implemented within a personal electronic device, such as a cellular telephone or personal computer, that is configured to test a memory device 15 inserted into or otherwise interfaced with the device. As a mere example, the memory analysis logic 22 may be a software application stored on the electronic device (e.g., a cellular telephone or personal computer) that runs on the device's operating system. When a memory device 15 is interfaced with the electronic device (e.g., when a memory card is inserted into a slot of a cellular telephone), the memory analysis logic 22 may communicate with the memory device 15 to obtain one or more performance signatures and then analyze such performance signatures to identify an origin of the memory device 15. The logic 22 may then display information indicative of the origin (e.g., the name of the manufacturer determined to have manufactured the memory device 15 or information indicating whether the memory device 15 is determined to have been manufactured by a particular manufacturer).

In other embodiments, the memory analysis logic 22 may run on a stand-alone device (e.g., an electronic testing device) that is specifically designed to test memory devices 15. To run a test of a memory device 15, the memory device 15 may be interfaced with the electronic testing device, and the memory analysis logic 22 may communicate with the memory device 15 to obtain one or more performance signatures and then analyze such performance signatures to identify an origin of the memory device 15. The logic 22 may then display information indicative of the origin (e.g., the name of the manufacturer determined to have manufactured the memory device 15 or information indicating whether the memory device 15 is determined to have been manufactured by a particular manufacturer).

According to the techniques described above, the memory analyzer 12 may be configured to receive training data indicative of performance signatures for memory devices 15 of a given manufacturer and, based on such training data, learn correlations or patterns in the training data so that it can accurately determine whether one or more performance signatures of a given memory device 15 correspond to the performance signatures of the training data to indicate that the device 15 is manufactured by the same manufacturer. This information may then be used to determine whether the memory device 15 is counterfeit (e.g., whether the memory device 15 has been manufactured by such manufacturer).

Further, in some embodiments, the memory analyzer 12 may be similarly trained on training data from multiple manufacturers so that the memory analyzer 12 may be able to identify which of the manufacturers manufactured a given memory device 15. Information indicative of the identity of such manufacturer may be provided (e.g., displayed) by the memory analyzer 12 so that a determination can be made whether the memory device 15 is counterfeit. In other embodiments, the information provided by the memory analyzer 12 may be used in other ways and for other purpose, as may be desired.

Now, therefore, the following is claimed:

1. A system, comprising:
a memory device; and
a memory analyzer coupled to the memory device and having at least one processor programmed with memory analysis logic that has been trained to learn correlations between a plurality of performance signatures from memory devices manufactured by a manufacturer, wherein the memory analysis logic when executed by the at least one processor is configured to:
receive at least one performance signature from the memory device, the at least one performance signature based on a performance of the memory device in performing a memory operation on memory cells of the memory device, wherein the at least one performance signature is uniquely generated by the memory device based on at least manufacturing variations of the memory device;
identify an origin of the memory device based on the at least one performance signature and the learned correlations; and
provide an output indicative of the origin.

2. The system of claim 1, wherein the at least one performance signature comprises a set of power-up default values stored in the memory cells after power up of the memory device.

3. The system of claim 1, wherein the memory analysis logic, when executed by the at least one processor, is configured to cause the memory device to induce errors in at least one data value stored in or read from the memory cells, and wherein the at least one performance signature is indicative of the errors.

4. The system of claim 1, wherein the memory analysis logic, when executed by the at least one processor, is configured to cause the memory device to induce latency errors in at least one data value stored in the memory cells by causing the memory device to (1) initiate a write operation for writing the at least one data value to the memory cells and (2) initiate a read operation for reading the memory cells a sufficiently short amount of time after initiating the write operation so that the latency errors are induced in data read by the read operation, and wherein the at least one performance signature is indicative of the latency errors.

5. The system of claim 1, wherein the output indicates whether the memory device is determined to be counterfeit.

6. The system of claim 1, wherein the memory device comprises dynamic random access memory (DRAM) having the memory cells, and wherein the memory analysis logic, when executed by the at least one processor, is configured to cause the memory device to induce refresh errors in at least one data value stored in the memory cells by controlling a rate that the memory device refreshes the memory cells, and wherein the at least one performance signature is indicative of the refresh errors.

7. A method, comprising:
receiving, at a memory analyzer, at least one performance signature from a memory device, the at least one performance signature based on a performance of the memory device in performing a memory operation on memory cells of the memory device, wherein the at least one performance signature is uniquely generated by the memory device based on at least manufacturing variations of the memory device, and wherein the memory analyzer has at least one processor programmed with memory analysis logic that has been trained to learn correlations between a plurality of performance signatures from memory devices manufactured by a manufacturer;
analyzing, by the memory analyzer, that at least one performance signature based on the learned correlations;
identifying, by the memory analyzer, an origin of the memory device based on the analyzing; and
providing an output indicative of the origin.

8. The method of claim 7, wherein the at least one performance signature comprises a set of power-up default values stored in the memory cells after power up of the memory device.

9. The method of claim 7, further comprising inducing errors in at least one data value stored in or read from the memory cells, wherein the at least one performance signature is indicative of the errors.

10. The method of claim 7, further comprising inducing latency errors in at least one data value stored in the memory cells by causing the memory device to (1) initiate a write operation for writing the at least one data value to the memory cells and (2) initiate a read operation for reading the memory cells a sufficiently short amount of time after initiating the write operation so that the latency errors are induced in data read by the read operation, wherein the at least one performance signature is indicative of the latency errors.

11. The method of claim 7, further comprising determining, with the memory analyzer, whether the memory device is counterfeit based on the origin, and wherein the output indicates whether the memory device is determined to be counterfeit.

12. The method of claim 7, wherein the memory device comprises dynamic random access memory (DRAM) having the memory cells, wherein the method further comprises inducing refresh errors in at least one data value stored in the memory cells by controlling a rate that the memory device refreshes the memory cells, and wherein the at least one performance signature is indicative of the refresh errors.

* * * * *